US007686381B1

(12) United States Patent
Leonard (10) Patent No.: US 7,686,381 B1
(45) Date of Patent: Mar. 30, 2010

(54) TRAILER DECK SYSTEM

(76) Inventor: Dianne M. Leonard, 4706 Cardinal Dr., Columbia, PA (US) 17512

( * ) Notice: Subject to any disclaimer, the term of this patent is extended or adjusted under 35 U.S.C. 154(b) by 0 days.

(21) Appl. No.: 12/238,155

(22) Filed: Sep. 25, 2008

(51) Int. Cl.
*B60P 3/37* (2006.01)

(52) U.S. Cl. ........................ 296/162; 296/172; 296/176; 296/26.15

(58) Field of Classification Search ................ 296/162, 296/165, 169, 172, 174, 176, 26.15; 52/68, 52/69, 64; 108/44
See application file for complete search history.

(56) References Cited

U.S. PATENT DOCUMENTS

| 1,771,911 | A | * | 7/1930 | Berneking | 296/176 |
|---|---|---|---|---|---|
| 2,786,710 | A | * | 3/1957 | Chapman | 296/162 |
| 3,750,351 | A | * | 8/1973 | Greenburg | 52/64 |
| 4,413,855 | A | * | 11/1983 | Flanagan | 296/162 |
| 4,535,933 | A | * | 8/1985 | Kuiper | 237/12.3 A |
| 4,869,030 | A | | 9/1989 | Clark | |
| 4,883,306 | A | | 11/1989 | Stucky | |
| 5,193,878 | A | | 3/1993 | Weaver | |
| 5,417,468 | A | | 5/1995 | Baumgartner et al. | |
| 5,899,518 | A | | 5/1999 | Schreiner | |
| 5,997,073 | A | | 12/1999 | Vanderhoof | |
| 6,502,893 | B1 | * | 1/2003 | Corliss, Jr. | 296/162 |
| 6,779,833 | B2 | | 8/2004 | Benz et al. | |
| 6,869,092 | B1 | * | 3/2005 | Henn | 280/166 |
| 7,093,888 | B2 | | 8/2006 | Anderson et al. | |
| 7,410,205 | B2 | * | 8/2008 | Cardwell et al. | 296/162 |
| 2004/0056510 | A1 | * | 3/2004 | Benz et al. | 296/162 |
| 2006/0006693 | A1 | * | 1/2006 | Anderson et al. | 296/162 |
| 2006/0145514 | A1 | | 7/2006 | Cardwell et al. | |
| 2006/0201072 | A1 | * | 9/2006 | Gibson | 52/69 |
| 2007/0187989 | A1 | * | 8/2007 | Brown et al. | 296/162 |
| 2008/0236055 | A1 | * | 10/2008 | Laprise | 52/64 |

* cited by examiner

*Primary Examiner*—Jason S Morrow (57) ABSTRACT

A trailer deck system includes a housing that includes a bottom wall, a top wall and a perimeter wall extending between the top and bottom walls. The perimeter wall includes at least one door to access an interior of the housing. The perimeter wall includes a lateral wall. A panel has a rear edge, a front edge, a first side edge, a second side edge, a top side and a bottom side. The rear edge is hingedly coupled to the perimeter wall to allow the panel to be moved between a stored position vertically orientated with the top side facing the lateral wall and an extended position extending outwardly from the lateral wall and is horizontally orientated. A motor assembly is mechanically coupled to the panel. The motor assembly moves the panel to the extended position or the stored position when the motor assembly is actuated.

18 Claims, 9 Drawing Sheets

TRAILER DECK SYSTEM

BACKGROUND OF THE INVENTION

Field of the Invention

The present invention relates to deck devices and more particularly pertains to a new deck device for providing a patio or deck area for a trailer or recreational vehicle.

SUMMARY OF THE INVENTION

The present invention meets the needs presented above by generally comprising a housing that includes a bottom wall, a top wall and a perimeter wall extending between the top and bottom walls. The perimeter wall includes at least one door to access an interior of the housing. The perimeter wall includes a lateral wall. A panel has a rear edge, a front edge, a first side edge, a second side edge, a top side and a bottom side. The rear edge is hingedly coupled to the perimeter wall to allow the panel to be moved between a stored position vertically orientated with the top side facing the lateral wall and an extended position extending outwardly from the lateral wall and is horizontally orientated. A motor assembly is mechanically coupled to the panel. The motor assembly moves the panel to the extended position or the stored position when the motor assembly is actuated.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 11 thereof, a new deck device embodying the principles and concepts of the present invention and generally designated by the reference numeral 10 will be described.

As best illustrated in FIGS. 1 through 11, the trailer deck system 10 generally comprises a housing 12 that includes a bottom wall 14, a top wall 16 and a perimeter wall 18 extending between the top 16 and bottom 14 walls. The perimeter wall 18 includes at least one door 20 to access and interior of the housing 12. The perimeter wall 16 includes a lateral wall 22 in which the door 10 is positioned. The housing 12 may define a trailer or a recreational vehicle, each of which is used for either short term or long term living quarters.

Figure 1:
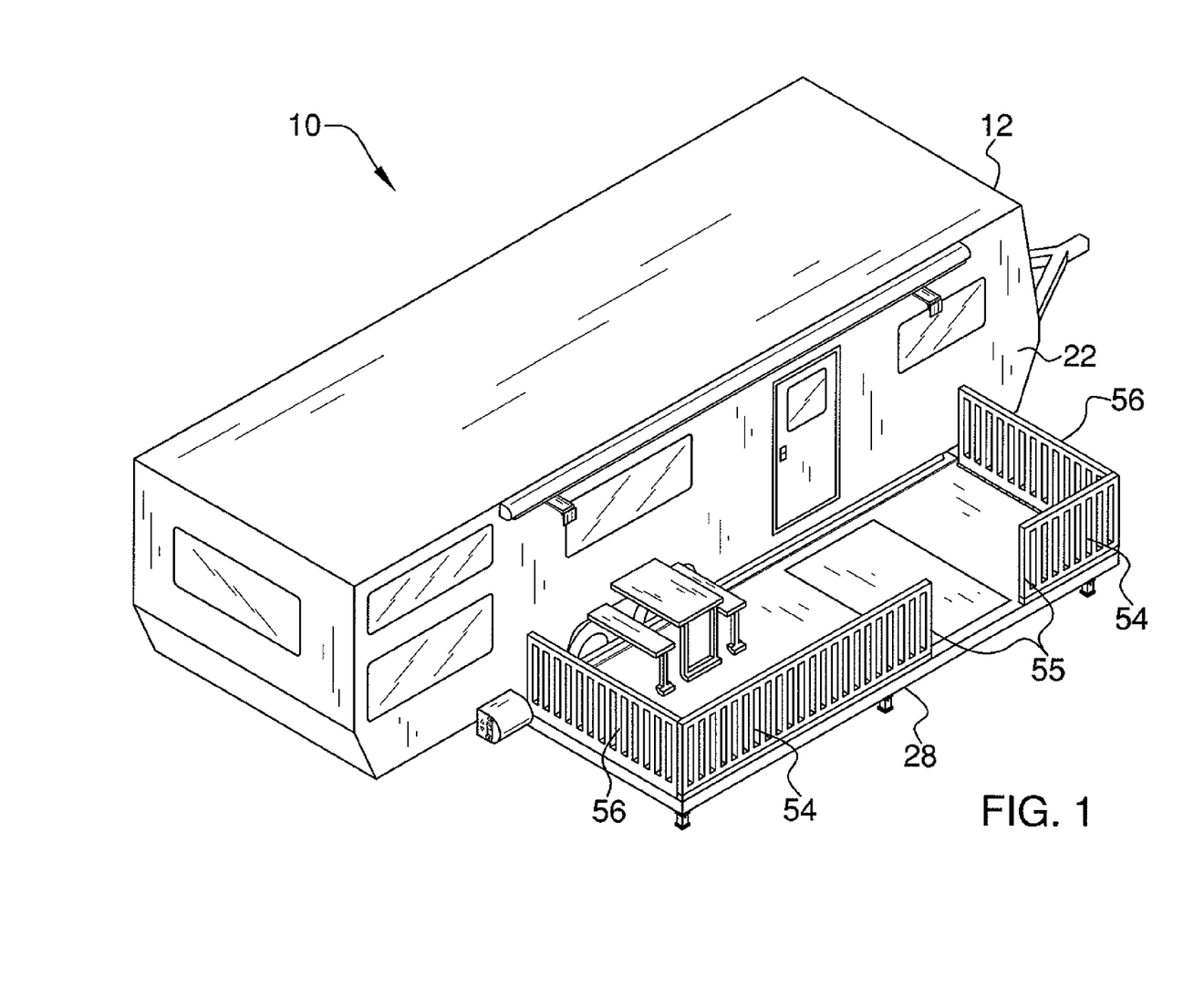
FIG. 1 is a top perspective view of a trailer deck system according to the present invention.
Figure 2:
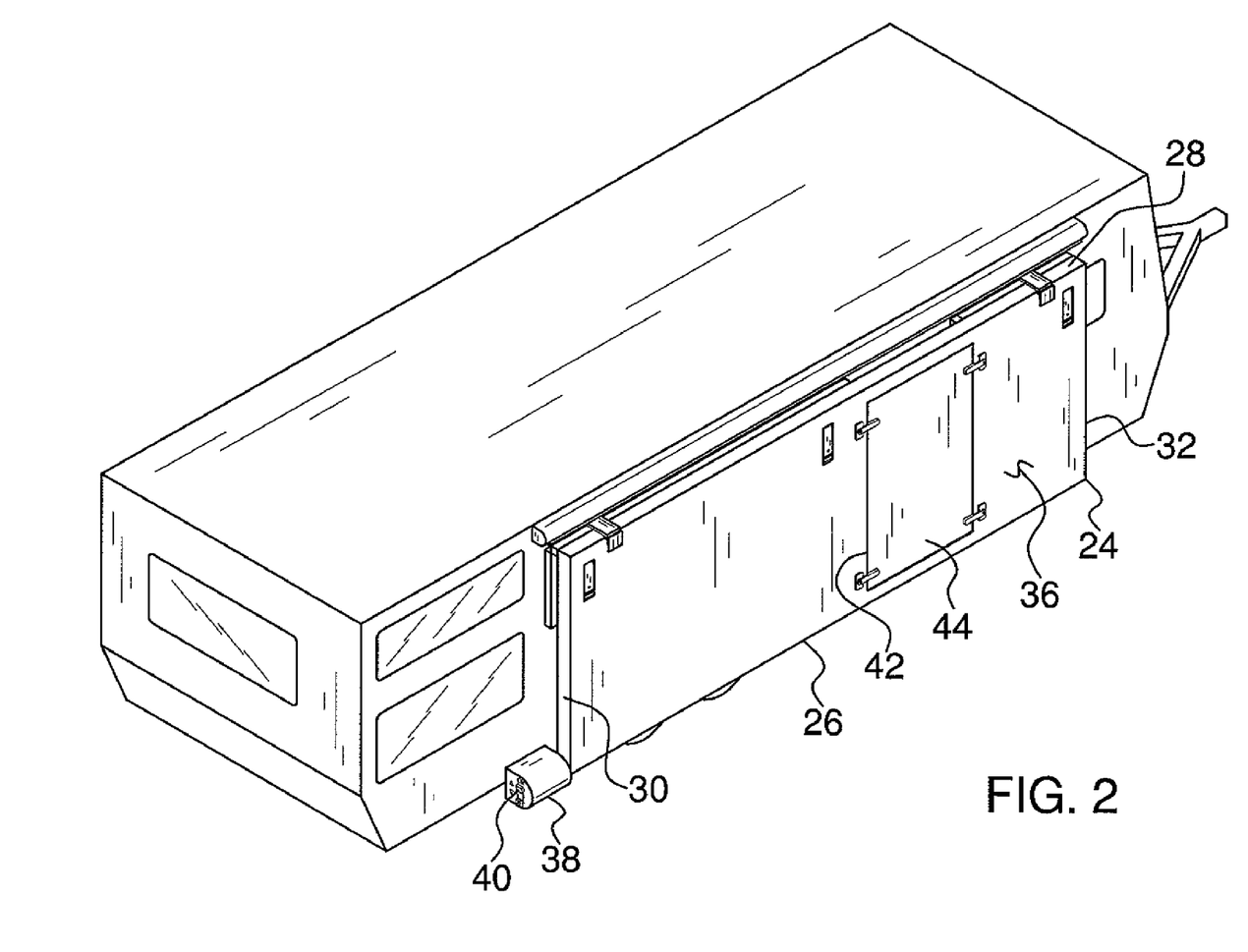
FIG. 2 is a top perspective view of the present invention in a stored position.
Figure 3:
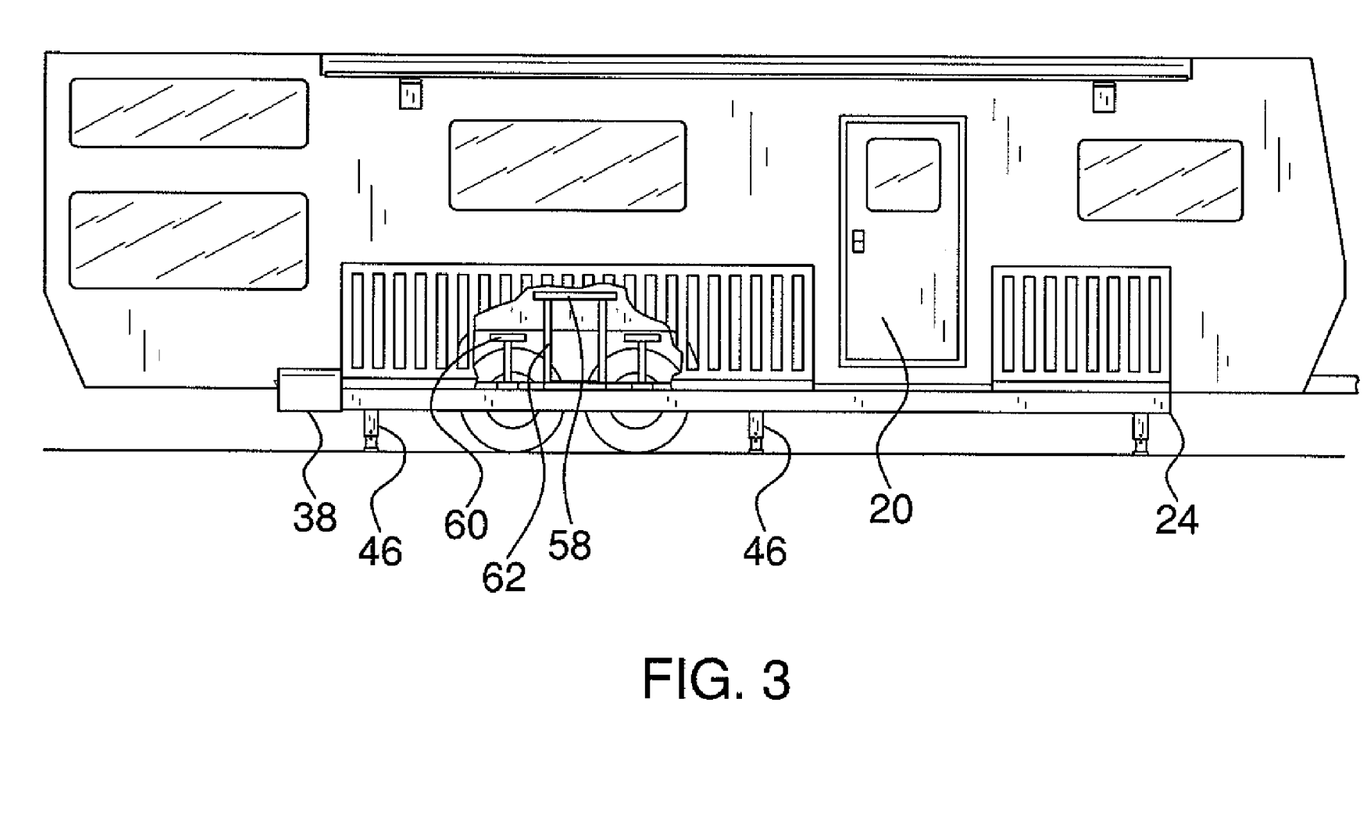
FIG. 3 is a front view of the present invention.
Figure 4:
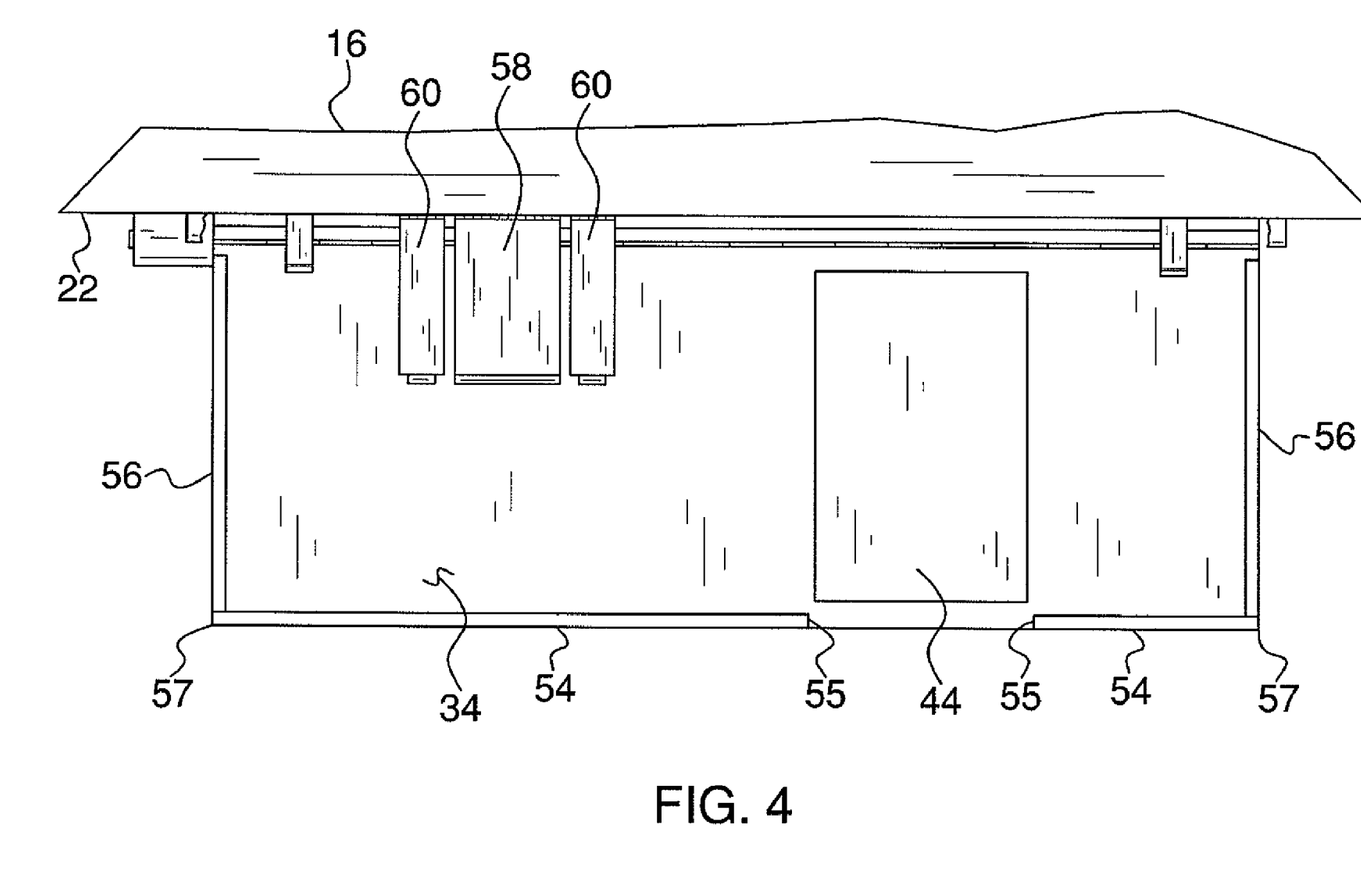
FIG. 4 is a top broken view of the present invention.
Figure 5:
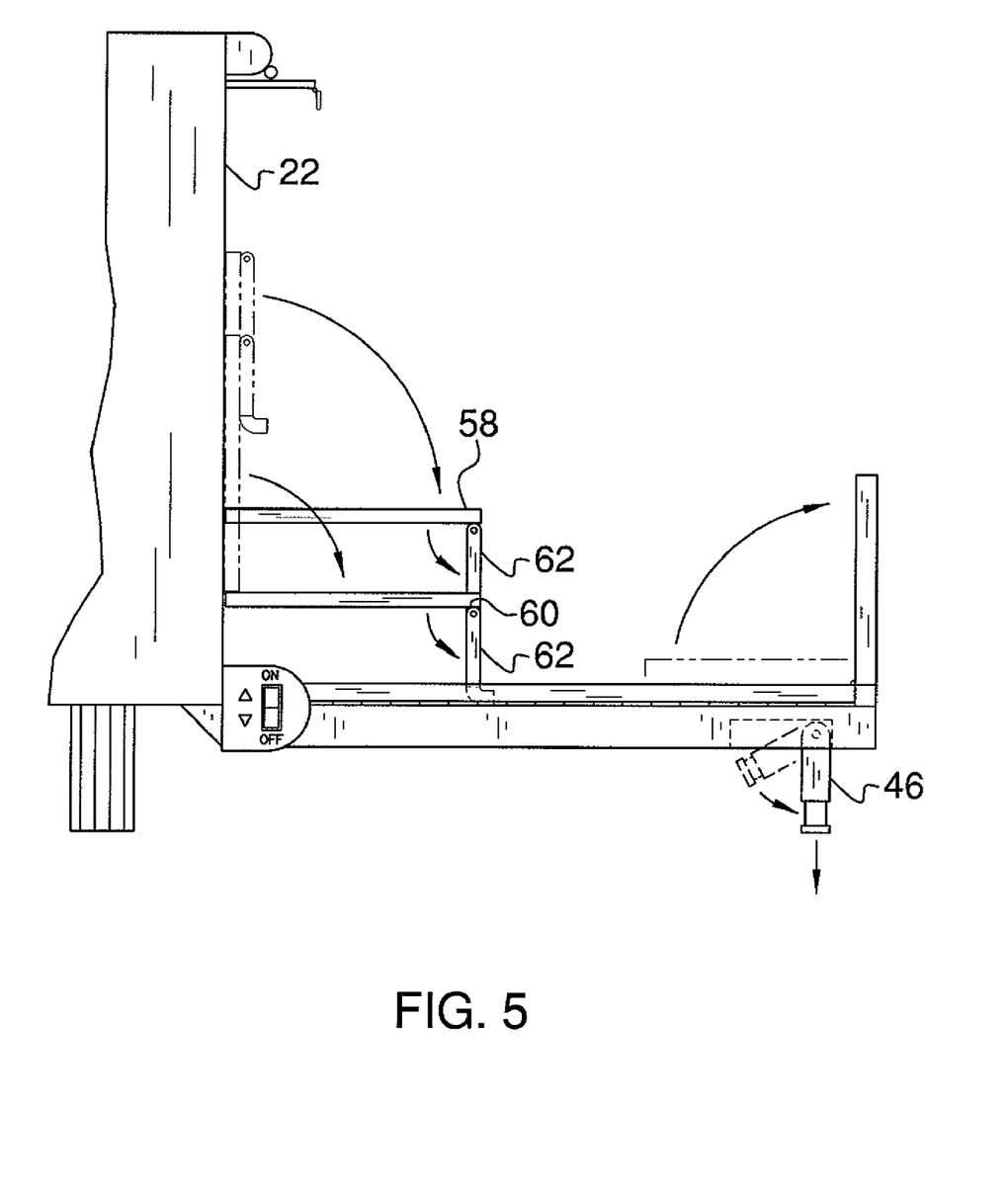
FIG. 5 is a broken side view of the present invention.
Figure 6:
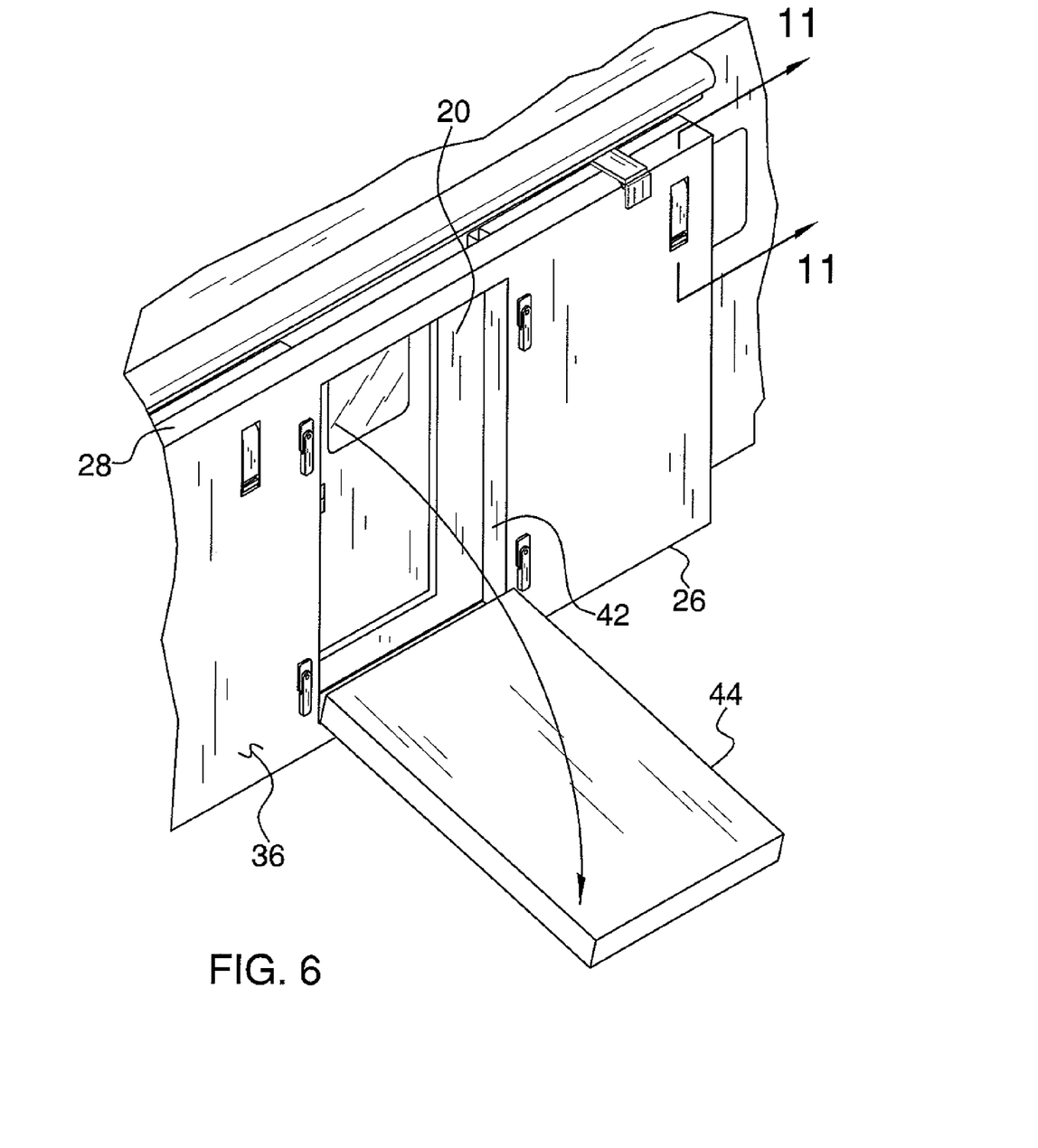
FIG. 6 is a front perspective view of the present invention.
Figure 7:
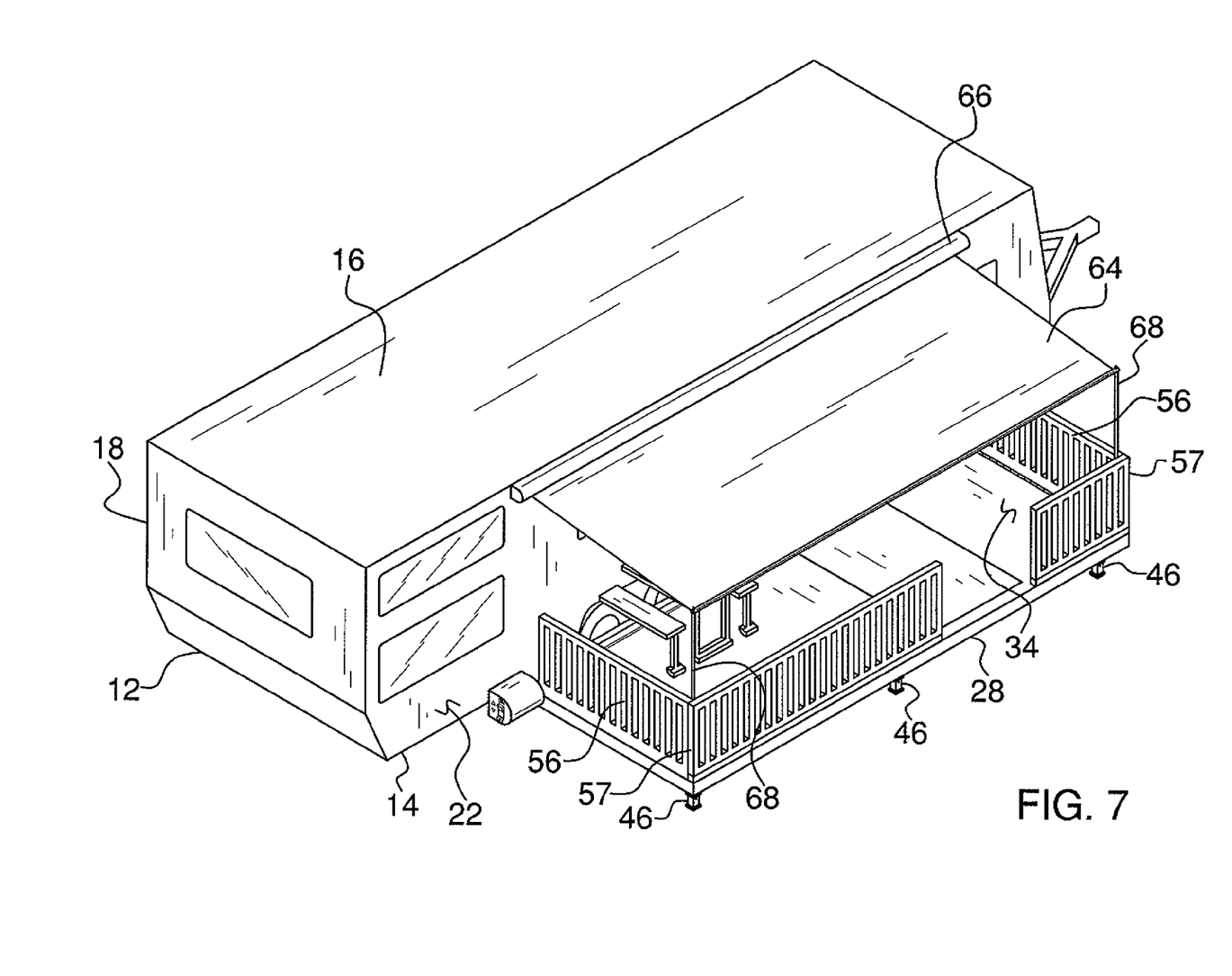
FIG. 7 is a top perspective view of the present invention.
Figure 8:
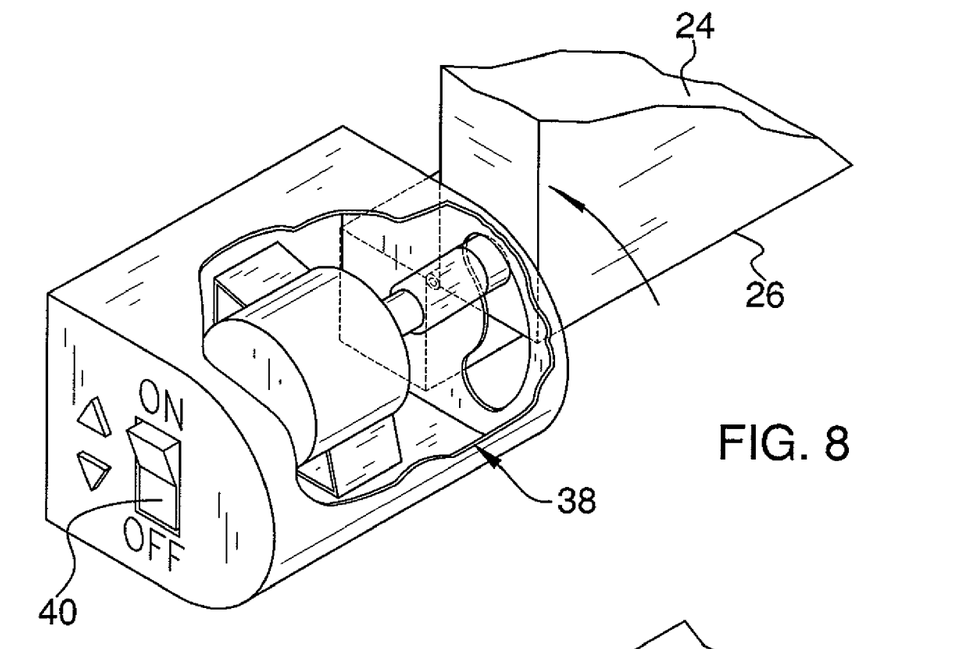
FIG. 8 is an enlarged broken view of a motor assembly of the present invention.
Figure 9:
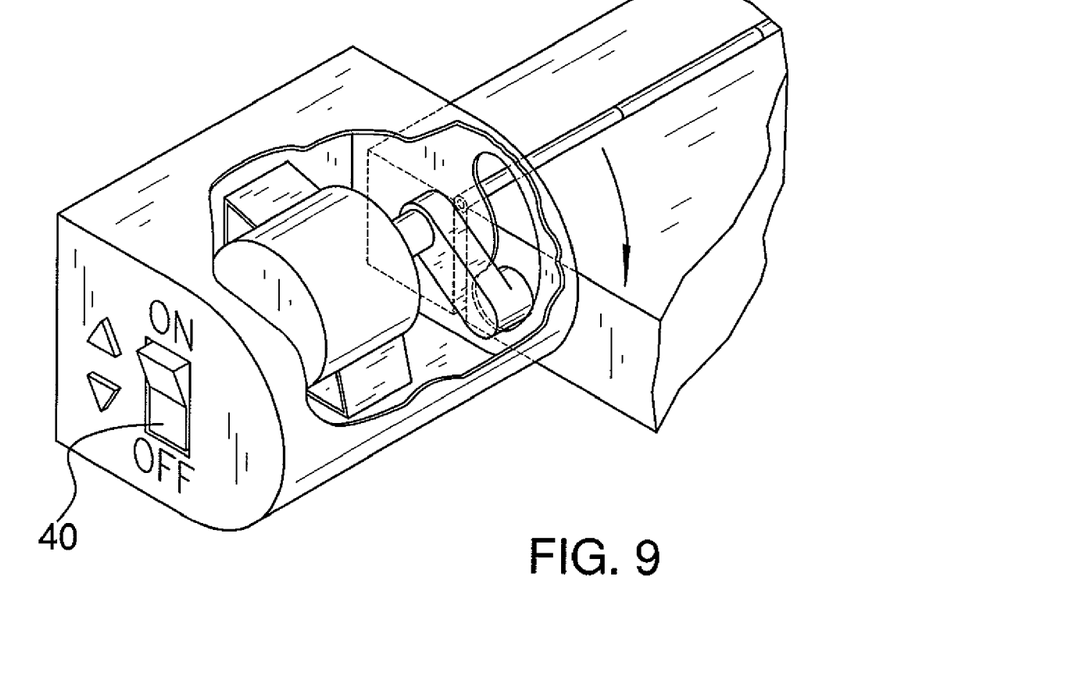
FIG. 9 is an enlarged broken view of a motor assembly of the present invention.
Figure 10:
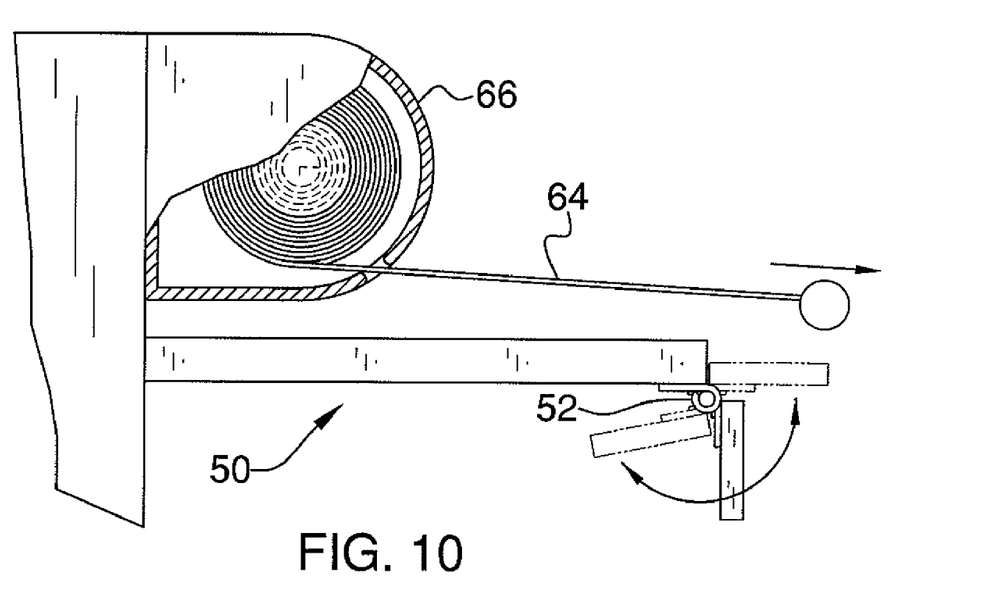
FIG. 10 is a side broken view of a canopy of the present invention.
Figure 11:
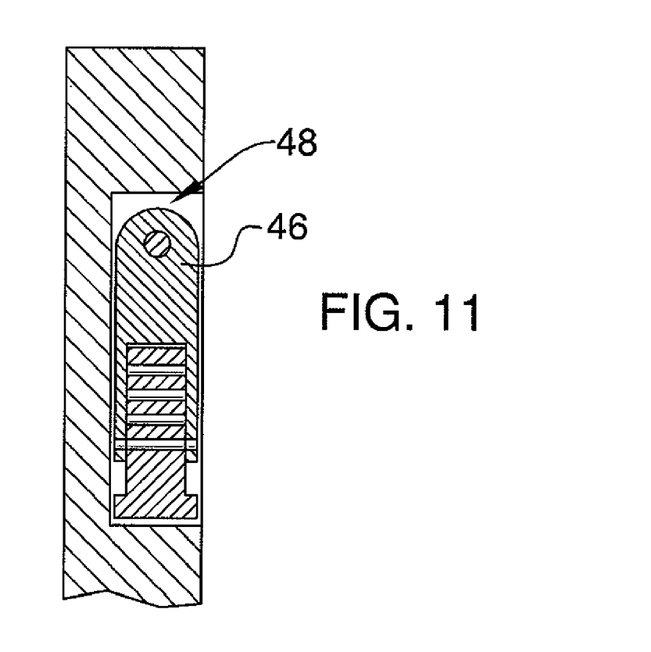
FIG. 11 is a cross-sectional view taken along line 11-11 of FIG. 6 of the present invention.

A panel 24 has a rear edge 26, a front edge 28, a first side edge 30, a second side edge 32, a top side 34 and a bottom side 36. The rear edge 26 is hingedly coupled to the perimeter wall 22 beneath the door 20 to allow the panel 24 to be moved between a stored position vertically orientated with the top side 34 facing the lateral wall 22 and an extended position extending outwardly from the lateral wall 22 and is horizontally orientated. A motor assembly 38 is mechanically coupled to the panel 24. The motor assembly 38 moves the panel 24 to the extended position or the stored position when the motor assembly 38 is actuated. The motor assembly 38 includes an actuator 40 for selecting the direction in which the panel 12 will pivot. The motor assembly 38 includes a conventional electric motor mechanically coupled to the panel 24 as shown in FIG. 8. An aperture 42 extends through the top 34 and bottom 36 sides of the panel 24 and is aligned with the door 20. A covering 44 is hingedly attached to the panel 24 to selective cover the aperture 42. The covering 44 is angled downwardly from the panel 24 and may form a ramp when the panel 24 is in a stored position.

A plurality of legs 46 attached to the bottom side 36. The legs 46 are pivotable with respect to the bottom side 36 to allow the legs 36 to be folded against the bottom side 36 when the panel 24 is in the stored position. Cavities 48 may be positioned in the bottom side 36 to receive the legs 46. Each of the legs 46 is, telescopic and has an adjustable height.

A coupler 50 is attached to the lateral wall 22 and releasably couples the panel 24 in the stored position. The coupler 50 includes a hinged plate that is biased toward the lateral wall 22 by a spring 52 to retain the panel 24 in the stored position.

A pair of guide rails 54 is provided. Each of the guide rails 54 is hingedly coupled to the top side 34 and is coextensive with the front edge 28. The guide rails 54 have a pair of proximal edges 55 with respect to each and that are spaced from each other to define an entrance opening. The guide rails 54 are positionable in a folded position extending toward the rear edge 26 of the panel 24 when the panel 24 is in the stored position and extending vertically upward from the top side 34 when the panel 12 is in the extended position.

A pair of side rails 56 may also be provided. Each of the guide rails 56 has a pair of distal edges 57 with respect to each other and each of the distal edges 57 has one of the side rails 56 pivotally coupled thereto. The side rails 56 are folded against one of the guide rails 56 when the panel 24 is in the stored position and are coextensive with one of the first 30 and second 32 side edges when the panel 24 is in the extended position.

A table 58 and bench 60 combination apparatus is pivotally coupled to the lateral wall 22 between the panel 24 and the top wall 16. The table 58 and bench 60 combination is folded against the lateral wall 22 when the panel 24 is in the stored position and horizontally orientated when the panel is in the extended position. The table 58 and bench 60 combination apparatus may include a pair of benches and a table each including legs 62 pivotally coupled to upper plates that define the table 58 and bench 60 or benches that extend downwardly from the upper plates to abut the top side 34 of the panel 24 and support the upper plates in a horizontal configuration.

A canopy 64 is attached to the lateral wall 22 adjacent to the top wall 16. The canopy 64 is extendable over the panel 24 when the panel 24 is in the extended position. The canopy 64 may be wound in a container 66 when not in use and posts 68 may be attached to the canopy 64 to hold the canopy 64 in spaced relationship with respect to the panel 24.

In use, the housing 12 is used as a conventional trailer. The panel 24, however, allows a deck to be extended from the housing 12 to form an outer patio area for the housing 12. When not in use, the panel 24 is folded against the housing 12 for storage purposes so that the housing 12 can be transported on a roadway.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A trailer deck system comprising:
   a housing including a bottom wall, a top wall and a perimeter wall extending between said top and bottom walls, said perimeter wall including at least one door to access an interior of said housing, said perimeter wall including a lateral wall;
   a panel having a rear edge, a front edge, a first side edge, a second side edge, a top side and a bottom side, said rear edge being hingedly coupled to said perimeter wall to allow said panel to be moved between a stored position vertically orientated with said top side facing said lateral wall and an extended position extending outwardly from said lateral wall and being horizontally orientated;
   a motor assembly being mechanically coupled to said panel, said motor assembly moving said panel to said extended position or said stored position when said motor assembly is actuated;
   a pair of guide rails, each of said guide rails being hingedly coupled to said top side and being coextensive with said front edge, said guide rails having a pair of proximal edges with respect to each and being spaced from each other to define an entrance opening, said guide rails being positionable in a folded position extending toward said rear edge of said panel when said panel is in said stored position and extending vertically upward from said top side when said panel is in said extended position;
   a pair of side rails, each of said guide rails having a pair of distal edges with respect to each other, each of said distal edges having one of said side rails pivotally coupled thereto, said side rails being folding against one of said guide rails when said panel is in said stored position and being coextensive with one of said first and second side edges when said panel is in said extended position; and
   a table and bench combination apparatus being pivotally coupled to said lateral wall between said panel and said top wall, said table and bench combination being folded against said lateral wall when said panel is in said stored position and horizontally orientated when said panel is in said extended position.

2. The system according to claim 1, further including a plurality of legs attached to said bottom side.

3. The system according to claim 2, wherein said legs are pivotable with respect to said bottom side to allow said legs to be folded against said bottom side when said panel is in said stored position.

4. The system according to claim 3, wherein each of said legs is telescopic and has an adjustable height.

5. The system according to claim 1, further including a coupler being attached to said lateral wall and releasably coupling said panel in said stored position.

6. The system according to claim 1, further including a canopy being attached to said lateral wall adjacent to said top wall, said canopy being extendable over said panel when said panel is in said extended position.

7. The system according to claim 2, further including a coupler being attached to said lateral wall and releasably coupling said panel in said stored position.

8. The system according to claim 7, further including a canopy being attached to said lateral wall adjacent to said top wall, said canopy being extendable over said panel when said panel is in said extended position.

9. The system according to claim 1, wherein an aperture extends through said top and bottom sides of said panel, said aperture being aligned with said door to allow access to said door when said panel is in said stored position, a covering being hingedly attached to said panel to selectively cover said aperture, said covering being angled downwardly from said panel and forming a ramp when said panel is in said stored position.

10. A trailer deck system comprising:
    a housing including a bottom wall, a top wall and a perimeter wall extending between said top and bottom walls, said perimeter wall including at least one door to access an interior of said housing, said perimeter wall including a lateral wall;
    a panel having a rear edge, a front edge, a first side edge, a second side edge, a top side and a bottom side, said rear edge being hingedly coupled to said perimeter wall to allow said panel to be moved between a stored position vertically orientated with said top side facing said lateral wall and an extended position extending outwardly from said lateral wall and being horizontally orientated, an aperture extending through said top and bottom sides of said panel, said aperture being aligned with said door to allow access to said door when said panel is in said stored position, a covering being hingedly attached to said panel to selective cover said aperture, said covering being angled downwardly from said panel and forming a ramp when said panel is in said stored position;
    a plurality of legs attached to said bottom side, said legs being pivotable with respect to said bottom side to allow said legs to be folded against said bottom side when said panel is in said stored position, each of said legs being telescopic and having an adjustable height;

a coupler being attached to said lateral wall and releasably coupling said panel in said stored position;

a pair of guide rails, each of said guide rails being hingedly coupled to said top side and being coextensive with said front edge, said guide rails having a pair of proximal edges with respect to each and being spaced from each other to define an entrance opening, said guide rails being positionable in a folded position extending toward said rear edge of said panel when said panel is in said stored position and extending vertically upward from said top side when said panel is in said extended position;

a pair of side rails, each of said guide rails having a pair of distal edges with respect to each other, each of said distal edges having one of said side rails pivotally coupled thereto, said side rails being folding against one of said guide rails when said panel is in said stored position and being coextensive with one of said first and second side edges when said panel is in said extended position;

a table and bench combination apparatus being pivotally coupled to said lateral wall between said panel and said top wall, said table and bench combination being folded against said lateral wall when said panel is in said stored position and horizontally orientated when said panel is in said extended position;

a motor assembly being mechanically coupled to said panel, said motor assembly moving said panel to said extended position or said stored position when said motor assembly is actuated; and a canopy being attached to said lateral wall adjacent to said top wall, said canopy being extendable over said panel when said panel is in said extended position.

11. A trailer deck system comprising:

a housing including a bottom wall, a top wall and a perimeter wall extending between said top and bottom walls, said perimeter wall including at least one door to access an interior of said housing, said perimeter wall including a lateral wall;

a panel having a rear edge, a front edge, a first side edge, a second side edge, a top side and a bottom side, said rear edge being hingedly coupled to said perimeter wall to allow said panel to be moved between a stored position vertically orientated with said top side facing said lateral wall and an extended position extending outwardly from said lateral wall and being horizontally orientated, said panel having an aperture therein extending through said top and bottom sides of said panel, said aperture being aligned with said door to allow access to said door when said panel is in said stored position, a covering being hingedly attached to said panel to selective cover said aperture, said covering being angled downwardly from said panel and forming a ramp when said panel is in said stored position; and a motor assembly being mechanically coupled to said panel, said motor assembly moving said panel to said extended position or said stored position when said motor assembly is actuated.

12. The system according to claim 11, further including a plurality of legs attached to said bottom side.

13. The system according to claim 12, wherein said legs are pivotable with respect to said bottom side to allow said legs to be folded against said bottom side when said panel is in said stored position.

14. The system according to claim 13, wherein each of said legs is telescopic and has an adjustable height.

15. The system according to claim 11, further including a coupler being attached to said lateral wall and releasably coupling said panel in said stored position.

16. The system according to claim 11, further including a pair of guide rails, each of said guide rails being hingedly coupled to said top side and being coextensive with said front edge, said guide rails having a pair of proximal edges with respect to each and being spaced from each other to define an entrance opening, said guide rails being positionable in a folded position extending toward said rear edge of said panel when said panel is in said stored position and extending vertically upward from said top side when said panel is in said extended position.

17. The system according to claim 16, further including a pair of side rails, each of said guide rails having a pair of distal edges with respect to each other, each of said distal edges having one of said side rails pivotally coupled thereto, said side rails being folding against one of said guide rails when said panel is in said stored position and being coextensive with one of said first and second side edges when said panel is in said extended position.

18. The system according to claim 11, further including a table and bench combination apparatus being pivotally coupled to said lateral wall between said panel and said top wall, said table and bench combination being folded against said lateral wall when said panel is in said stored position and horizontally orientated when said panel is in said extended position.

* * * * *